(12) United States Patent
Esser

(10) Patent No.: US 8,157,704 B2
(45) Date of Patent: Apr. 17, 2012

(54) METHOD FOR CONTROLLING THE DRIVETRAIN OF A MOTOR VEHICLE AND CONTROL UNIT FOR PERFORMING THE METHOD

(75) Inventor: Joachim Esser, Rutesheim (DE)

(73) Assignee: Dr. Ing. h.c. F. Porsche Akteingesellschaft, Stuttgart (DE)

( * ) Notice: Subject to any disclaimer, the term of this patent is extended or adjusted under 35 U.S.C. 154(b) by 442 days.

(21) Appl. No.: 12/463,443

(22) Filed: May 11, 2009

(65) Prior Publication Data
US 2009/0305846 A1    Dec. 10, 2009

(30) Foreign Application Priority Data
Jun. 6, 2008    (DE) .......................... 10 2008 027 150

(51) Int. Cl.
*B60W 10/02*    (2006.01)
*B60W 10/04*    (2006.01)
(52) U.S. Cl. ........................ 477/181; 477/175; 477/111
(58) Field of Classification Search .................. 477/174, 477/175, 180, 181, 111
See application file for complete search history.

(56) References Cited

U.S. PATENT DOCUMENTS

| | | | |
|---|---|---|---|
| 5,479,345 A | 12/1995 | Amsallen | |
| 5,649,880 A * | 7/1997 | Tsutsui et al. | 477/125 |
| 6,463,821 B1 * | 10/2002 | Reed et al. | 74/330 |
| 6,519,522 B1 | 2/2003 | Wolf et al. | |
| 2003/0144114 A1 * | 7/2003 | Sayman et al. | 477/175 |
| 2005/0221950 A1 | 10/2005 | Eriksson et al. | |
| 2005/0282683 A1 * | 12/2005 | Tanba et al. | 477/180 |

FOREIGN PATENT DOCUMENTS

DE    19839837 A1    3/2000

* cited by examiner

*Primary Examiner* — Roger Pang

(57) ABSTRACT

A method controls a drivetrain of a motor vehicle having an internal combustion engine, an automatic transmission with at least two discrete transmission stages, and a clutch which is controlled automatically. The method is characterized in that when there is a transmission output speed at which the transmission input speed in an n-th transmission stage would be above a minimum rotational speed of the internal combustion engine and a transmission input speed in an (n+1)-th transmission stage would be below the minimum rotational speed, the drivetrain is operated in the (n+1)-th transmission stage with a slipping clutch and a rotational speed of the internal combustion engine which is above the minimum rotational speed. A control unit is configured to carry out such a method.

16 Claims, 2 Drawing Sheets

METHOD FOR CONTROLLING THE DRIVETRAIN OF A MOTOR VEHICLE AND CONTROL UNIT FOR PERFORMING THE METHOD

CROSS-REFERENCE TO RELATED APPLICATION

This application claims the priority, under 35 U.S.C. §119, of German application DE 10 2008 027 150.0, filed Jun. 6, 2008; the prior application is herewith incorporated by reference in its entirety.

BACKGROUND OF THE INVENTION

Field of the Invention

The invention relates to a method for controlling a drivetrain of a motor vehicle having an internal combustion engine, an automatic transmission with at least two discrete transmission stages, and a clutch which is controlled automatically. The invention also relates to a control unit for carrying out the method. Such a method and such a control unit are respectively known per se.

In order to delimit transmissions with a continuously variable transmission ratio, automatic transmissions with discrete transmission stages are also referred to below as multi-step transmissions.

In all types of automatic multi-step transmissions in drivetrains of motor vehicles, the changeover between the discrete transmission stages takes place as a function of operating parameters of the drivetrain such as load and rotational speed of the internal combustion engine and the velocity of the motor vehicle.

A certain drive power from the internal combustion engine can frequently be made available by different pairs of values of the torque and rotational speed since the power is proportional to the product of the torque and the rotational speed. The same drive power can therefore alternatively be made available when there is a low rotational speed and a large charge of the combustion chamber and therefore a large torque, or when there is a relatively high rotational speed and a relatively small charge of the combustion chamber and therefore a relatively small torque.

However, despite the power being the same, the fuel consumption is greater at operating points with a relatively high rotational speed and a relatively small torque than at operating points with a relatively low rotational speed and a relatively large torque.

The shifting programs of known automatic transmissions therefore select a transmission ratio which is as long as possible in operating states with low power requirements so that the required power is made available when the rotational speed is as low as possible and there is a correspondingly high torque of the internal combustion engine.

While infinitely variable transmissions permit infinitely variable adaptation of the transmission ratio to the respective speed at the engine speed with the minimum specific consumption, multi-step transmissions in conjunction with known control systems do not permit engine speeds with optimum consumption to be set for all speeds.

An example is a situation in which the vehicle is traveling at a specific speed of, for example, 50 km/h in the sixth gear speed of a multi-step transmission with seven gear speeds, since the engine speed which would occur in the seventh gear speed would be lower than a predetermined minimum rotational speed $n\_min$ of the internal combustion engine. In this example, the clutch which is controlled automatically will be arranged between the internal combustion engine and the multi-step transmission.

In the specified example, a transmission input speed $n\_6$ will occur in the sixth gear speed when the clutch is closed. The rotational speed $n\_6$ is above the rotational speed which is optimum for consumption and which is between the minimum rotational speed $n\_min$ and the rotational speed $n\_6$ in this example. This results in an undesired additional consumption of fuel and undesirably increased $CO_2$ emissions in comparison with a transmission ratio at which the engine speed with the lowest specific consumption could be set.

SUMMARY OF THE INVENTION

It is accordingly an object of the invention to provide a method for controlling the drivetrain of a motor vehicle and a control unit for performing the method that overcome the above-mentioned disadvantages of the prior art devices and methods of this general type, with which the specified disadvantage in terms of consumption and the specified disadvantage of increased $CO_2$ emissions can be reduced.

With the foregoing and other objects in view there is provided, in accordance with the invention, a method for controlling a drivetrain of a motor vehicle having an internal combustion engine, an automatic transmission with at least two discrete transmission stages, and a clutch controlled automatically. When there is a transmission output speed at which a transmission input speed in an n-th transmission stage would be above a minimum rotational speed of the internal combustion engine and the transmission input speed in an (n+1)-th transmission stage would be below the minimum rotational speed, the drivetrain is operated in the (n+1)-th transmission stage with a slipping clutch and a rotational speed of the internal combustion engine being above the minimum rotational speed.

In a driving situation in which a motor vehicle is traveling at a certain speed at which the engine speed is in a gear speed with a number n higher than a permitted minimum rotational speed of the internal combustion engine and in a gear speed with number n+1 lower than the permitted minimum rotational speed, a conventional control unit would engage the n-th gear speed and operate the drivetrain with a closed clutch.

In contrast, in the method according to the invention the higher gear speed is engaged, the internal combustion engine is operated at a rotational speed at above the minimum rotational speed and the clutch is operated in the slip state. In other words, instead of operating the drivetrain in the gear speed n with the clutch closed, the n+1-th gear speed is engaged and the clutch is operated in the slip state, preferably in a regulated slip state, with the result that the transmission input speed when the clutch is slipping can differ from the rotational speed of the internal combustion engine.

In the exemplary situation according to the above with a velocity of 50 km/h, according to the invention, the seventh gear speed, at which the associated transmission input speed is below the minimum rotational speed of the internal combustion engine, is engaged. In contrast, the internal combustion engine is operated at its minimum rotational speed or with a relatively high rotational speed. In order to permit the difference in rotational speed, the clutch is operated in the slipping state (slip).

Operating the drivetrain in the seventh gear speed avoids, in this example, unnecessarily high engine speeds which would occur if the clutch were closed and the sixth gear speed were engaged. As a result the consumption of fuel is reduced.

The invention has this aimed-at effect generally in a driving situation in which the transmission input speed is so low that the transmission input speed in an n-th transmission stage of the multi-step transmission would still be above a minimum rotational speed of the internal combustion engine, and the transmission input speed in an (n+1)-th transmission stage would already be below the minimum rotational speed of the internal combustion engine.

Other features which are considered as characteristic for the invention are set forth in the appended claims.

Although the invention is illustrated and described herein as embodied in a method for controlling the drivetrain of a motor vehicle and a control unit for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
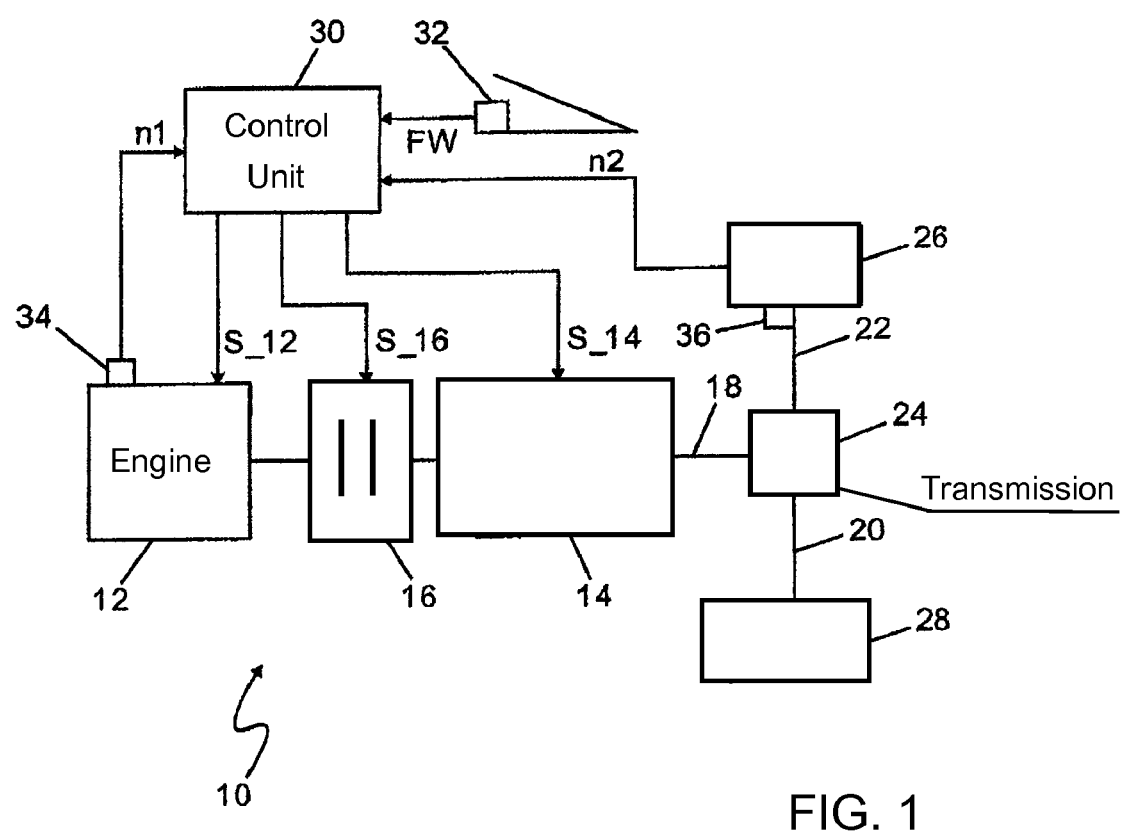
FIG. 1 is a block diagram of a drivetrain of a motor vehicle according to the invention.

Referring now to the figures of the drawing in detail and first, particularly, to FIG. 1 thereof, there is shown a drivetrain 10 of a motor vehicle having an internal combustion engine 12, an automatic transmission 14 with at least two discrete transmission stages and with a clutch 16 which is controlled automatically. The torque which is generated by the internal combustion engine 12 is transmitted, with the clutch 16 closed, to drive wheels 26, 28 of the motor vehicle via the automatic transmission 14 and shafts 18, 20, 22 and/or the transmission 24. A control unit 30 controls the drivetrain 10 by a manipulated variable S_12 for influencing the torque and the rotational speed n of the internal combustion engine 12, a manipulated variable S_14 for controlling the changeover between discrete transmission stages in the automatic transmission 14, and an actuation signal S_16 for controlling the clutch 16.

The generation of torque in the internal combustion engine 12 is controlled by means of interventions into its air system and/or its fuel system and/or its ignition system. In order to form the specified manipulated variables S_12, S_14, S_16, the control unit 30 processes signals in which operating parameters of the drivetrain 10 are mapped and which are made available by sensors of the drivetrain 10. In the embodiment which is illustrated in FIG. 1, an accelerator pedal signal transmitter 32 supplies a torque request FW (driver's request). A rotational speed sensor 34 supplies a signal relating to the rotational speed n1 of the internal combustion engine 12, and a wheel speed sensor 36 supplies a rotational speed signal n2 which is proportional to the output speed of the automatic transmission 14.

Furthermore, the control unit 30 is configured, in particular programmed, to control the sequence of the method according to the invention and/or the sequence of an embodiment of the method according to the invention.

In the embodiment which is illustrated in FIG. 1, the control unit 30 controls the entire drivetrain 10, that is to say the internal combustion engine 12, the automatic transmission 14 and the clutch 16 which is controlled automatically. Of course, instead of a single control unit 30, a grouping of a plurality of control units can also be used, which control units for their part are coordinated by a central control unit or communicate with one another via a bus system in order to coordinate their individual actuation interventions into the drivetrain 10.

Given knowledge of the transmission ratio which is set in the automatic multi-step transmission 14, the transmission-side clutch rotational speed is obtained as a linear function of the velocity v and therefore of the rotational speed n2. The relationship between the actuation signal S_16 and the torque which is respectively transmitted via the clutch 16 when there are specific differences in rotational speed is preferably stored in the form of characteristic curves or characteristic diagrams in the control unit 30. This is state of the art. The differences in rotational speed are also known in the control unit 30 by evaluating the rotational speed values n1 and n2. The engine torque which is continuously calculated by the control unit 30 from operating characteristic variables of the internal combustion engine 12 is also known, since modern engine controllers determine all the manipulated variables on the basis of torque requests which are calculated, for example, as a function of the driver's request FW.

The control unit 30 determines, from the difference in rotational speed at the clutch 16 and the actuation signal S_16 which is ultimately mapped in the pressing force of the clutch friction faces, the value of the torque which is transmitted via the clutch 16.

The control unit 30 can therefore control the flow of torque via the clutch 16 in order to set the engine speed n1 by actuating the clutch 16. In one embodiment, the actuation is preferably carried out here in a regulated fashion. For this purpose, the actual value of the engine speed n1 is compared with a setpoint value and a manipulated variable S_16, with which the torque transmission via the clutch 16 is controlled, is formed from the control error.

Figure 2:
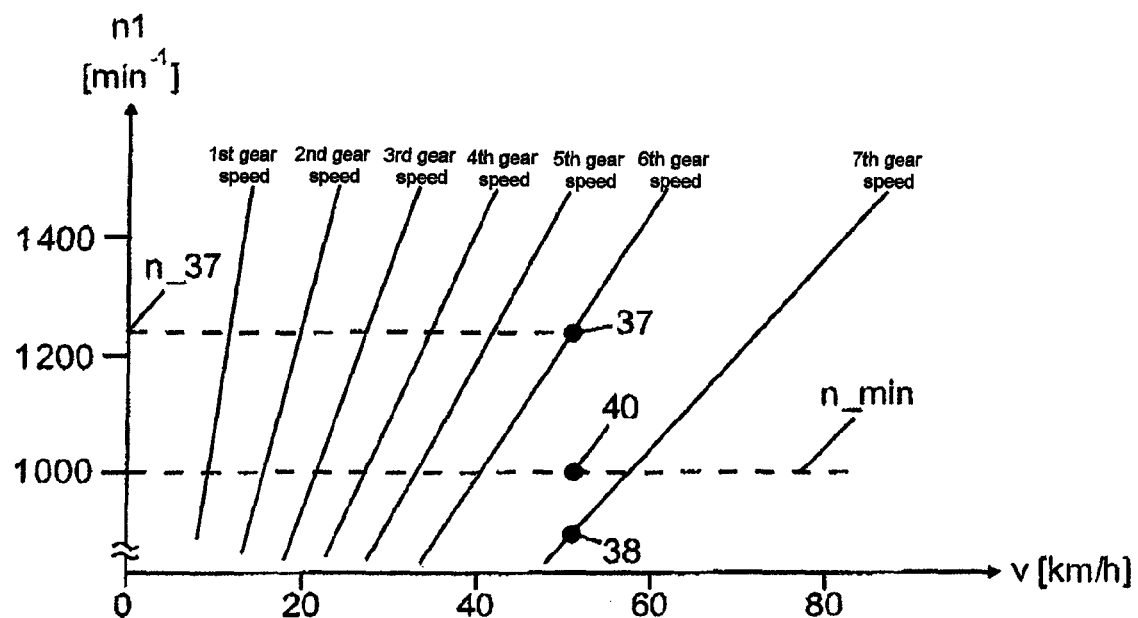
FIG. 2 is a graph showing profiles of rotational speeds of an internal combustion engine in the drivetrain as a function of velocity and of an engaged gear speed in an automatic multi-step transmission.

FIG. 2 shows profiles of rotational speeds n1 of the internal combustion engine 12 as a function of the velocity v and as a function of the engaged gear speed in an automatic transmission 14 with seven gear speeds. The individual profiles are respectively mapped here for a specific interval of the rotational speed n1, which extends from approximately 800 $min^{-1}$ to 1600 $min^{-1}$ in FIG. 2. A minimum rotational speed n_min for the internal combustion engine 12 in the usual driving mode is shown in FIG. 2 with an n1 value of 1000 $min^{-1}$. The value of such a minimum rotational speed results, for example, from requirements for judder-free operation during acceleration from low rotational speeds.

In the example in FIG. 2, a motor vehicle which is operated without the invention is operated at a speed of approximately 50 km/h at maximum in the sixth of seven gear speeds. Here, when the clutch 16 is closed the relatively high rotational speed of 1230 $min^{-1}$ occurs in the sixth gear speed. This value is above the minimum rotational speed n_min and therefore leads to a disadvantage in terms of consumption compared to operation at a lower rotational speed. At the predefined velocity of 50 km/h, the next lowest engine speed n1 which is possible in the next highest, seventh gear speed with the clutch closed is 860 min$^{-1}$. This value is, however, already below the minimum rotational speed n_min. In the state of the art, the sixth gear speed in the automatic transmission 14 is therefore engaged and the motor vehicle is operated at 50 km/h with the correspondingly high rotational speed of 1230 min$^{-1}$.

This situation constitutes an example that when there is a transmission output speed at which the transmission input speed in an n-th transmission stage the drivetrain 10 would be above a minimum rotational speed n_min of the internal combustion engine 12, and in an (n+1)-th transmission stage the drivetrain would be below the minimum rotational speed n_min. In FIG. 2, this corresponds to the operating point 37 for the n-th gear speed and the operating point 38 for the (n+1)-th gear speed. In the state of the art, the minimum rotational speed n_min is prevented from being undershot by virtue of the fact that the next lowest gear speed, here the n-th gear speed, is engaged and the drivetrain 10 is subsequently operated with the clutch closed 16 and at the increased engine speed n1 which is favorable for consumption.

In order to operate the internal combustion engine 12 with optimum consumption in such a situation, the drivetrain 10 is operated according to the invention in the (n+1) transmission stage with the clutch 16 slipping and at a rotational speed n1 which is at its minimum rotational speed n_min or at a higher rotational speed. In the example in FIG. 2, the clutch 16 is operated in the slip state in such a way that in the seventh gear speed a rotational speed n1 of the internal combustion engine 12 which is equivalent to the minimum rotational speed n_min occurs. This corresponds to the operating point 40.

Figure 3:
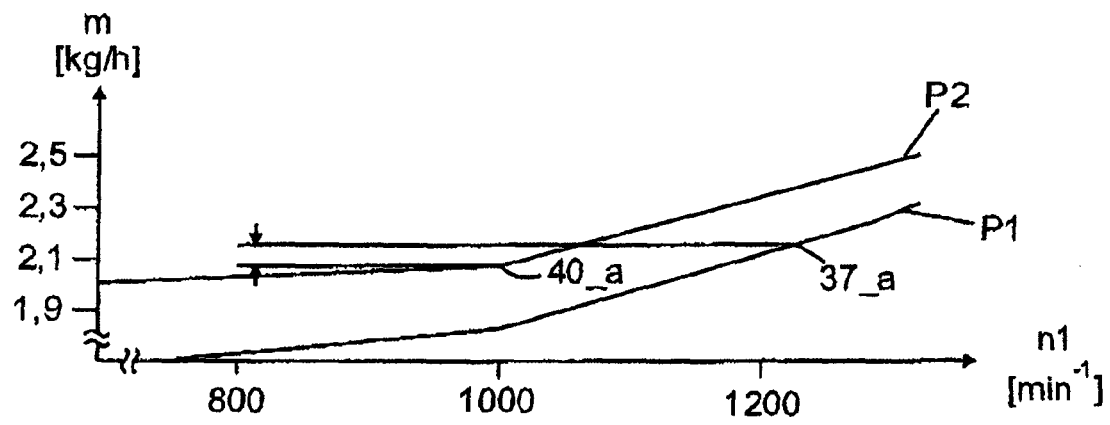
FIG. 3 is a graph showing a consumption of fuel plotted against an engine speed for various values of constant power levels of an internal combustion engine.

The internal combustion engine 12 is therefore operated, in particular, at a rotational speed which is below a first value n_37 of the transmission input speed, which value n_37 would occur in the sixth transmission stage or more generally in the next lowest, n-th-transmission stage and at the same transmission output speed. In FIG. 3, the consumption m of fuel is plotted against the engine speed n1 for various values of constant power levels P1=4.5 kW, P2=5.3 kW of an internal combustion engine 12 in kg/h. As is to be expected, the consumption increases at rotational speed values with increasing power. In addition, the consumption increases when the power is constant and the rotational speed increases. The point 37_a is at a rotational speed of 1230 min$^{-1}$ and at a power level of approximately 4.5 kW of the internal combustion engine 12. It is assigned to the point 37 from FIG. 2. In other words, when the velocity is 50 km/h, an engine speed of 1230 min$^{-1}$ occurs in the sixth gear speed with the clutch 16 closed. In order to overcome the traveling resistances which occur in this context, a power level of approximately 4.5 kW is necessary here. This results in a consumption of fuel of approximately 2.15 kg/h.

The point 40_a is at a rotational speed of 1000 min$^{-1}$ and a power level of the internal combustion engine 12 of approximately 5.3 kW. It is assigned to the point 40 from FIG. 2. In other words, when the velocity is 50 km/h, a rotational speed of 1000 min$^{-1}$ is set when the seventh gear speed is engaged and the clutch 16 is slipping. In order to overcome the sum of the traveling resistances and the friction losses at the slipping clutch 16, a power level of approximately 5.3 kW is necessary here. This results in a consumption of fuel of approximately 2.05 kg/h.

With respect to the operating points 37_a, 40_a, the invention provides for the drivetrain to be operated at the operating point 40_a with the (n+1)-th gear speed engaged and the clutch 16 slipping. The friction loss of approximately 5.3 kW−4.5 kW=0.8 kW which occurs at the clutch 16 here can be readily discharged in a wet clutch by means of the oil cooling system.

A significant positive secondary effect of the power dissipation which occurs when the clutch slips is that as a result the transmission oil is heated more quickly to operating temperature after a cold start. As a result of the more rapid warming up, the drag losses and the resulting additional consumption of fuel when the transmission oil is cold are significantly reduced.

One preferred embodiment therefore provides that the method is carried out as a function of a measure of the temperature of the transmission oil. Here, the temperature of the transmission oil can be determined by measuring or modeling as a function of operating parameters of the drivetrain 10.

One preferred embodiment is characterized by the fact that the method is carried out only if the temperature of the transmission oil is below a threshold value. The threshold value is preferably defined here in such a way that at a high transmission oil temperature at which further application of heat would contribute to excessively rapid aging of the transmission oil is not carried out.

The lowering of the engine speed n1 results in a gain in efficiency. On the other hand, a loss in efficiency occurs as a result of the slipping of the clutch 16. In order to achieve a saving in fuel, the loss of efficiency which occurs when the clutch 16 slips must be less than the gain in efficiency which is achieved by lowering the engine speed n1.

One preferred embodiment therefore provides that the method is carried out only if the gain in efficiency which is obtained by operating the internal combustion engine 12 at an engine speed n1 which is below the first value of the transmission input speed is greater than a loss of efficiency which results due to friction losses at the slipping clutch 16.

The power dissipation which occurs when the clutch 16 slips is comparatively low in the relevant driving states and can be discharged readily in a wet clutch by the oil cooling system. In the example in FIG. 3, the power dissipation to be discharged is 5.3 kW−4.5 kW=0.8 kW.

The relevant driving states are characterized by the fact that the necessary driving power is less than a predetermined threshold value. One preferred embodiment therefore provides that the method is carried out only if the necessary driving power, which depends decisively on the driver's request FW, is less than a predetermined threshold value.

Alternatively or additionally there is provision that the method is carried out only if friction occurring at the slipping clutch 16 is smaller than a predefined threshold value. A further preferred embodiment provides that the method is carried out only if the transmission output speed is lower than a predefined threshold value and a torque request by a driver is less than a predefined threshold value.

The automatic transmission 14 can be an automated transmission, a double-clutch transmission or a fully automatic transmission with sets of planetary gears, wherein the invention is not restricted to these types of transmission but can be used in any automatic transmission with discrete transmission stages and at least one clutch which is controlled automatically.

In each of the specified transmissions, at least one clutch which is controlled automatically is involved in the transmission of torque, with rigid transmission of power taking place when the clutch is closed and a slipping clutch permitting a difference in rotational speed between the driving component and the driven component.

In an automated transmission, the flow of force between the internal combustion engine and the automated transmission is controlled with the clutch. In this context, both the selection of the transmission ratio and the activation of the clutch occur automatically when starting and stopping and when the transmission ratio is changed.

The double clutch transmission is composed of two component transmissions which can be respectively coupled to the internal combustion engine via a component-transmission-specific clutch at the transmission input and which jointly act on an output shaft at the transmission output. As a rule, the even numbered gear speeds (transmission stages) are made available by one of the component transmissions, while the uneven numbered gear speeds are made available by the other component transmission.

In a fully automatic transmission, clutches in the form of braking belts and/or multi-disk clutches are used to release and/or lock sun gears, planetary gear carriers or crown gears, resulting in the different transmission stages. Furthermore, many fully automatic transmissions have a controllable clutch as a starting element and/or for bypassing a hydrodynamic torque converter.

The invention claimed is:

1. A method for controlling a drivetrain of a motor vehicle having an internal combustion engine, an automatic transmission with at least two discrete transmission stages, and a clutch controlled automatically, which comprises the steps of:
when there is a transmission output speed at which a transmission input speed in an n-th transmission stage would be above a minimum rotational speed of the internal combustion engine and the transmission input speed in an (n+1)-th transmission stage would be below the minimum rotational speed, operating the drivetrain in the (n+1)-th transmission stage with a slipping clutch and a rotational speed of the internal combustion engine being above the minimum rotational speed.

2. The method according to claim 1, which further comprises operating the internal combustion engine at a rotational speed which is below a first value of the transmission input speed which would be obtained in the n-th transmission stage and above the minimum rotational speed.

3. The method according to claim 2, which further comprises performing the method if a gain in efficiency which is obtained by operating the internal combustion engine at an engine speed which is below the first value of the transmission input speed is greater than a loss of efficiency which results due to friction losses at the slipping clutch.

4. The method according to claim 1, which further comprises performing the method if a necessary drive power is less than a predetermined threshold value.

5. The method according to claim 1, which further comprise performing the method only if friction occurring at the slipping clutch is smaller than a predefined threshold value.

6. The method according to claim 1, which further comprises performing the method if the transmission output speed is lower than a predefined threshold value and a torque request by a driver is less than a predefined threshold value.

7. The method according to claim 1, which further comprises performing the method in dependence on a measure of a temperature of transmission oil.

8. The method according to claim 7, which further comprises performing the method only if the temperature of the transmission oil is below a threshold value.

9. A control system for controlling a drivetrain of a motor vehicle having an internal combustion engine, an automatic transmission with at least two discrete transmission stages, and a clutch being controlled automatically, the control system comprising:
a control unit performing a method for operating the drivetrain in a (n+1)-th transmission stage with a slipping clutch and a rotational speed of the internal combustion engine being above a minimum rotational speed when there is a transmission output speed at which a transmission input speed in an n-th transmission stage would be above the minimum rotational speed of the internal combustion engine, and the transmission input speed in the (n+1)-th transmission stage would be below the minimum rotational speed.

10. The control unit according to claim 9, wherein said control unit is programmed to operate the internal combustion engine at a rotational speed which is below a first value of the transmission input speed which would be obtained in the n-th transmission stage and above the minimum rotational speed.

11. The control unit according to claim 10, wherein said control unit is programmed to perform the method if a gain in efficiency which is obtained by operating the internal combustion engine at an engine speed which is below the first value of the transmission input speed is greater than a loss of efficiency which results due to friction losses at the slipping clutch.

12. The control unit according to claim 9, wherein said control unit is programmed to perform the method if a necessary drive power is less than a predetermined threshold value.

13. The control unit according to claim 9, wherein said control unit is programmed to perform the method only if friction occurring at the slipping clutch is smaller than a predefined threshold value.

14. The control unit according to claim 9, wherein said control unit is programmed to perform the method if the transmission output speed is lower than a predefined threshold value and a torque request by a driver is less than a predefined threshold value.

15. The control unit according to claim 9, wherein said control unit is programmed to perform the method in dependence on a measure of a temperature of transmission oil.

16. The control unit according to claim 15, wherein said control unit is programmed to perform the method only if the temperature of the transmission oil is below a threshold value.

* * * * *